April 13, 1965
W. M. ROBINSON
3,178,623
WOUND METALLIZED CAPACITOR
Filed April 19, 1960
2 Sheets-Sheet 1
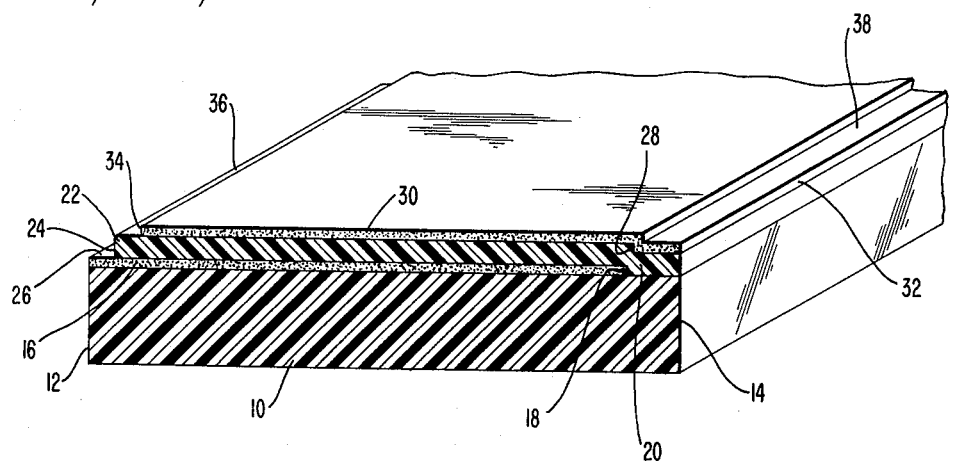
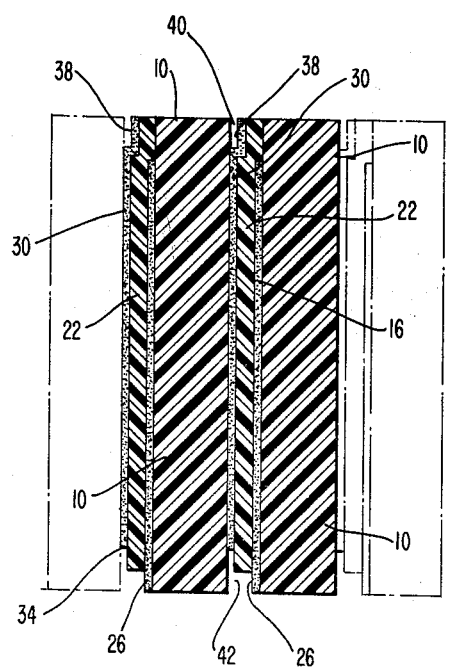
INVENTOR.
WILLIAM M. ROBINSON
BY
ATTORNEY

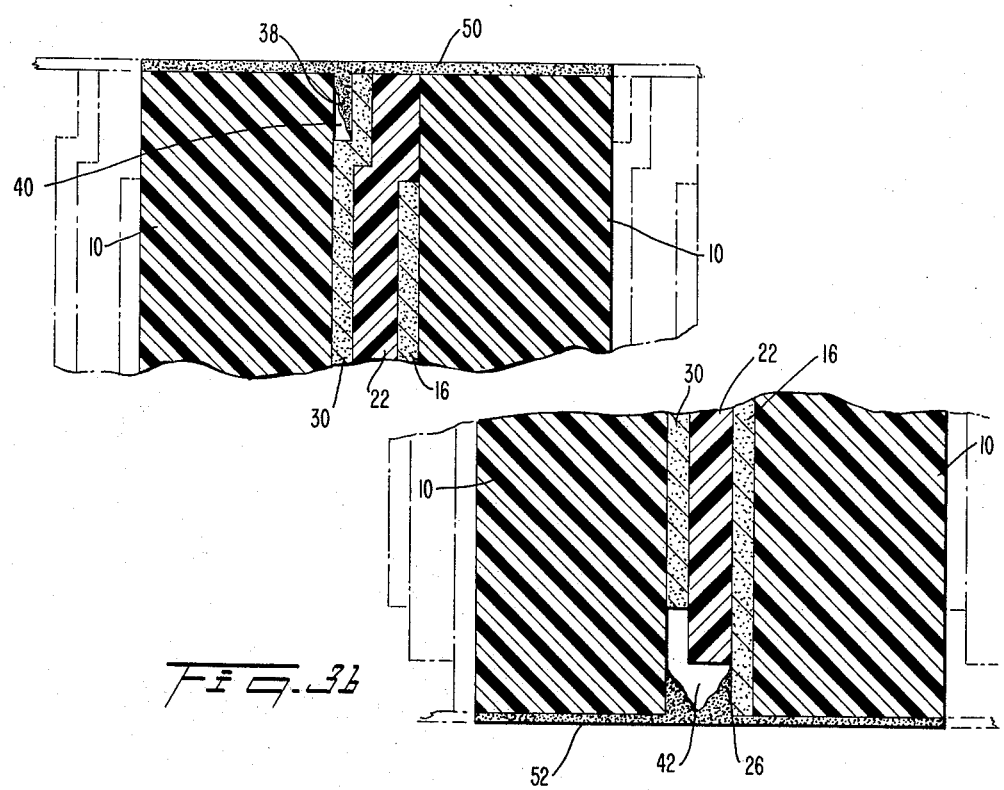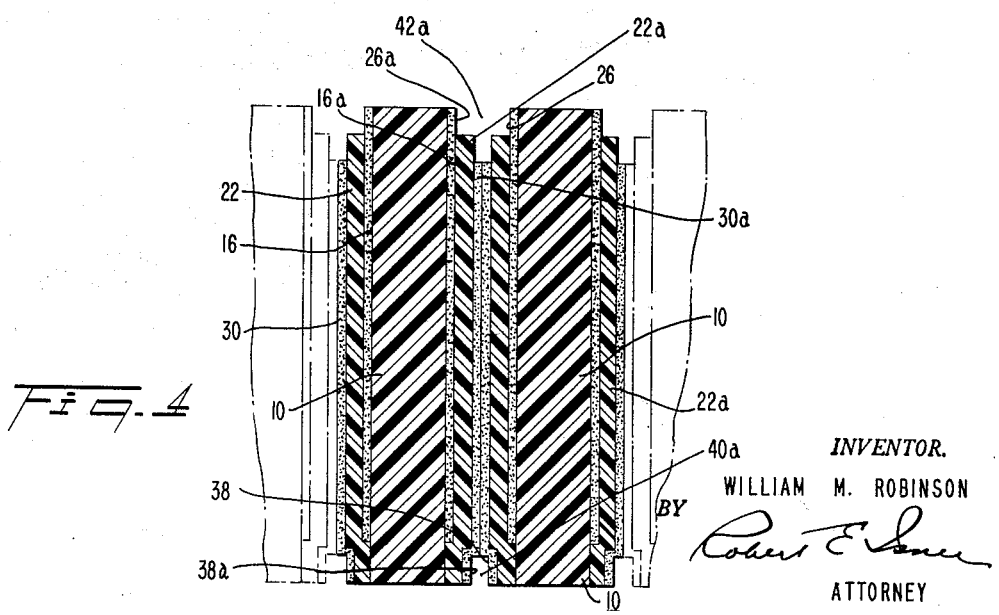

United States Patent Office

3,178,623
Patented Apr. 13, 1965

3,178,623
WOUND METALLIZED CAPACITOR
William M. Robinson, Fairhaven, Mass., assignor to Cornell-Dubilier Electric Corporation, New Bedford, Mass., a corporation of Delaware
Filed Apr. 19, 1960, Ser. No. 23,165
10 Claims. (Cl. 317—258)

This invention relates to multi-strata metallized dielectric films and in particular to the patterning of such films to readily permit the utilization thereof in the commercial fabrication of electrical capacitors.

It has long been recognized that the capacitance of an electric capacitor is directly proportional to the magnitude of the dielectric constant of the dielectric media employed and to the area of the electrode elements; and is inversely proportional to the spacing of such electrode elements with such spacing being essentially the same as the thickness of the dielectric media utilized and interposed therebetween. Desirable dielectric materials are recognized as those having a high dielectric constant, a high dielectric strength, a high insulation resistance, a low dielectric loss and the capability of being formed into thin sheets or strips with a high degree of surface continuity.

Comparatively recent advances in the chemical arts have resulted in the commercial availability of various resins and polymeric compounds having desirable dielectric properties as well as the capability of being formed into extremely thin strips or films with an extremely high degree of surface continuity. Advantageous utilization of the beneficial dielectric properties of these materials appear to be obtainable by formation of multi-strata laminae thereof with interposed conducting electrode elements and with such dielectric and conducting laminae being preferably in the form of extremely thin and inseparable films effected by known vacuum deposition techniques.

Although such multi-strata film-type laminae appear to offer considerable promise for the commercial fabrication of electrical capacitors of diminutive size and improved character, the very thinness of the dielectric and conducting films, which are both desirable and advantageous from the standpoint of electrode spacing and diminution of capacitor size and from the standpoint of utilization of the inherent self-healing properties of metallized dielectric media, presents appreciable problems in effecting the practical securing of the required selective non-inductive terminations to the electrode films which are necessary to convert these multi-strata film-type laminae into practical and useful electrical capacitors. It is to the solution of this latter problem that this invention is directed.

This invention may be briefly described as an improved construction for multi-strata bonded film type laminae of dielectric and conducting media that readily permits the securing of terminations thereto. Included therein is the selective positioning of the conducting and dielectric films to provide exposed termination strips adjacent the marginal edge portion of a laminae and to provide for marginal edge portions of selectively reduced thickness to assure termination accessibility of said exposed termination strips in convolutely wound sections thereof. This invention also includes an improved construction for electrical capacitor subassemblies formed of convolutely wound multi-strata bonded laminae of dielectric and conducting films.

Among the advantages of this invention is the provision of a novel construction for multi-strata bonded film laminae that readily permits the selective securing of non-inductive terminations to the film-type electrode elements in convolutely wound sections thereof, the provision of useful convolutely wound capacitor subassemblies formed of such multi-strata film-type laminae and the provision of means whereby the theoretically desirable and advantageous properties of such multi-strata bonded laminae of dielectric and conducting films may be readily utilized in the commercial fabrication of electrical capacitors.

The object of this invention is the provision of an improved construction for multi-strata bonded laminae of dielectric and conducting films.

A further object of this invention is the provision of an improved construction for multi-strata bonded laminae of dielectric and conducting films that readily permits the selective securing of terminations to the electrode films in convolutely wound sections thereof.

Other objects and advantages of the invention will be set forth in the following specification and claims and will be illustrated in the accompanying drawings which show, by way of example, the principles underlying the invention together with the presently preferred embodiments of multi-strata bonded film laminae incorporating those principles.

Referring to the drawings:

FIGURE 1 is an oblique view, partially in section and on an enlarged scale, showing a portion of a strip of multi-strata bonded film laminae of conducting and dielectric layers constructed in accordance with the principles of this invention.

FIGURE 2 is a vertical sectional view of the strip of multi-strata bonded film laminae illustrated in FIGURE 1, illustrating the disposition of adjacent layers thereof in a convolutely wound section thereof.

FIGURES 3a and 3b are vertical sectional views, on a still further enlarged scale, of the termination structures in a convolutely wound section of the type illustrated in FIGURE 2.

FIGURE 4 is a vertical section view, on an enlarged scale, of another type of strip of multi-strata bonded film laminae of conducting and dielectric layers constructed in accordance with the principles of this invention and illustrating the disposition of adjacent layers thereof in a convolutely wound section.

In its broad aspects, the principles underlying this invention include the selective positioning of dielectric and conducting films in a multi-strata bonded film laminae to provide for exposed termination strips along the marginal edges of the conducting films and a selective proportioning of composite laminae thickness transversely of an elongate web thereof to assure exposure and consequent availability of said marginal termination strips for non-inductive termination affixation purposes in convolutely wound sections thereof. The following portions of this specification illustrate, by way of example, the application of these principles to particular multi-strata bonded film laminae of conducting dielectric layers.

Referring now to the drawings, and particularly to FIGURE 1, there is illustrated, by way of example, a portion of an elongate strip of a multi-strata bonded film laminae of dielectric and conducting layers. The illustrated multi-strata laminae includes a supporting structure in the form of a basal substrate 10 having first and second marginal edges 12 and 14 and in the form of a thin film of a polymeric resinous compound, suitably a high molecular weight polymeric terephthalic polyester such as polymethylene terephthalate or polyethylene terephthalate. Such polymeric terephthalic polyesters are well known in the art and may be obtained by reacting a polymethylene glycol with terephthalic acid in such proportions that about one molecular proportion of the glycol is present relative to the terephthalic acid. Films composed of this resinous material, known by the trade name "Mylar" of the Du Pont Corp., can be obtained in web or strip form as thin as .00025 inch and such a thickness is eminently suitable for utilization as the basal substrate 10, as illustrated in the drawings. Alternatively, the basal substrate 10 can be formed of other dielectric media including paper or other polymeric compounds having the desired advantageous dielectric properties. A suitable paper would be .00025 or .00017 inch kraft paper. Other usable polymeric compounds include the polyhaloethylenes, suitably chlorotrifluoroethylene and preferably polytetrafluoroethylene, which can also be formed into elongate films as thin as .00025 inch.

Disposed on the upper surface of the basal substrate 10 is a first thin conducting film or layer 16 of substantially uniform thickness. The thickness of this conducting film should be such as to provide the desirable self-healing properties of metallized dielectric media and yet not result in undue values of resistance. Because of the extreme thinness of these films, the proper characteristics are best defined in terms of resistance per square of surface area. A suitable range of such values would be from about .5 to 2.0 ohms per square, preferably from .6 to 1.2 ohms per square. The conducting film 16 is preferably in the form of a physically inseparable metallic film, suitably of aluminum or zinc, of approximately .000001 inch thick such as effected by conventional high vacuum deposition processes.

As illustrated, one marginal edge of the first conducting film 16 extends up to and is disposed in alignment with the first marginal edge 12 of the substrate 10 and the second marginal edge thereof 18 is spaced inwardly a predetermined distance, in the order of a 1/16 inch in the illustrated example, from the second marginal edge 14 of the substrate 10. The illustrated disposition of the second marginal edges 18 and 14 of the first conducting film and substrate 10 respectively serves to leave an uncovered or exposed strip of substrate surface 20 of substantially uniform width along said second marginal edge 14 thereof. The desired definition of the recessed marginal edge 18 of the first conducting film 16 can be readily effected by known masking or demetallizing techniques during the deposition of said conducting film 16 on the substrate surface.

For convenience, the physically inseparable relationship of the deposited films as effected by vacuum deposition and similar techniques will hereinafter be termed as a "bonded" engagement or relationship.

Bonded to the upper surface of the first conducting film 16 and to the uncovered or exposed marginal strip 20 on the surface of the basal substrate 10 is a first thin dielectric film 22 of substantially uniform thickness. The first dielectric film 22 is preferably in the form of a physically inseparable film of about .00005 inch thick of a polymeric compound having advantageous dielectric properties and formed by known electrostatic or vacuum deposition or casting techniques. By way of example, usable polymeric compounds include the polyhaloethylenes, suitably chlorotrifluoroethylene and preferably polytetrafluoroethylene, commercially known under the trade name "Teflon" of the Du Pont Corporation.

As illustrated, the first dielectric film 22 has its first marginal edge 24 spaced inwardly a predetermined distance from the aligned first marginal edge of the basal substrate 10 and the first conducting film 16 leaving an exposed or uncovered marginal termination strip 26 of conducting film 16 of a width of about 1/32 of an inch in the illustrated example. The second marginal edge of the first dielectric film 22 extends up to and is disposed in alignment with the second marginal edge 14 of the substrate 10 and by such positioning covers the heretofore exposed marginal strip 20 of substrate surface and second marginal edge 18 of the first conducting film 16. Because the first dielectric film 22 is deposited in substantially uniform thickness, the portion thereof covering the marginal edge 18 of the first conducting film 16 and exposed surface strip 20 of the substrate 10 will be stepped in nature, as indicated at 28, resulting in a diminution of laminae thickness, by an amount equal to the thickness of the first conducting film 16, along said second marginal edge of said substrate. The desired definition of the recessed first marginal edge 24 of the first dielectric film 22 can be readily effected by known masking techniques during the deposition of said film.

Bonded to the upper surface of the first dielectric film 22 is a second thin conducting film or layer 30 of substantially uniform thickness and of a character similar to that of the first conducting film 16. The second conducting film 30 is preferably in the form of a physically inseparable metallic film, suitably of aluminum or zinc, of approximately .000001 inch thick, such as effected by conventional high vacuum deposition processes.

As illustrated, one marginal edge 32 of the second conducting film 30, conveniently designatable as the second marginal edge thereof, extends up to and is disposed in alignment with the second marginal edge of the first dielectric film 22. Such disposition, due to the uniform thickness of the film 30, does not change the relative diminution in the thickness of said marginal edge portion of the laminae relative to the remainder thereof. The other or first marginal edge 34 of the second conducting film 30 is spaced inwardly a predetermined distance, in the order of 1/32 inch in the illustrated example, from the heretofore described recessed marginal edge 24 of the first dielectric film 22. The inward disposition of this marginal edge 34 relative to the marginal edge 24 of the underlying first dielectric film 22 serves to leave an uncovered or exposed strip of dielectric film 36 of substantially uniform width along said marginal edge thereof. Additionally, the illustrated inward disposition of the marginal edge 34 of the second conducting film 30 relative to the heretofore described recessed marginal edge 24 of the first dielectric film 22 serves to effectively locate said marginal edge 34 a predetermined distance inwardly of the exposed marginal edge of the first conducting layer 16 which is disposed in alignment with the first marginal edge 12 of the substrate 10. For the exemplary dimensions, the first marginal edge 34 of the second conducting layer 30 will be disposed about 1/16 inch inwardly of the first marginal edge 12 of the basal substrate 10 and as such is spaced inwardly a distance approximately equivalent to the inward spacing of the second marginal edge 18 of the first conducting layer 16 relative to the second marginal edge 14 of the substrate 10. The desired definition of the marginal edge 34 of the second conducting film 30 relative to the first dielectric film 22 can be readily effected by known masking techniques during the deposition of said conducting film 30 on the surface of the dielectric film 22.

In the multi-strata bonded film laminae illustrated and described above, the disposition of the marginal edge of the first conducting layer 16 in coalignment with the marginal edge 12 of the substrate 10 and the stepped recessing of the adjacent marginal edges 24 and 34 of the first dielectric film 22 and second conducting film 30 respectively renders the surface area of the exposed marginal termination strip 26 of said first conducting film 16 available for termination affixation purposes in a convolutely wound section thereof. In a similar manner, the diminution in thickness adjacent the second marginal edge 14 of the dielectric substrate 10, effected by the inward disposition of the second marginal edge 18 of the first conducting film 16 and the overlaying film 30, which are of substantially uniform thickness, results in the provision of an exposed marginal termination strip 38 defined by the step 28 on the upper surface of the second conducting film 30, the surface of which is also available for termination affixation purposes in a convolutely wound section thereof.

FIGURE 2 illustrates the lateral availability of the exposed marginal termination strips 26 and 38 for selective termination affixation to the first and second conducting films in a convolutely wound section. As there shown, the marginal termination strip 38 will be convolutely disposed at one end of a convolutely wound section. The afore-described diminution in thickness of the multi-strata laminae at said location results in the presence of a recess 40 intermediate the laterally disposed surface of the marginal termination strip 38 and the adjacent undersurface of the basal substrate 10 and in consequent exposure thereof. Similarly, the marginal termination strip 26 will be convolutely disposed at the other end of the convolutely wound section. The recessed disposition of the adjacent marginal edges of the first dielectric film 22 and second conducting film 30 results in the presence of a recess 42 intermediate the laterally disposed surface of the marginal termination strip 26 and the adjacent undersurface of the basal dielectric substrate 10 and in consequent exposure thereof.

FIGURES 3a and 3b illustrate, on a greatly enlarged scale, how selective terminations are formed on the ends of the convolutely wound unit of FIGURE 2. As there illustrated, the ends of the convolutely wound units are sprayed with finely divided or atomized metal, as by the Schoop or Fiore process, to form essentially integral and continuous metal coatings 50 and 52 thereon. If desired, the end coatings can be patterned by utilization of masking materials. These metal coatings will enter the recesses 40 and 42 and be deposited on the exposed and laterally disposed surfaces of the marginal termination strips 26 and 38 of the first and second electrode films 16 and 30, respectively. The exposure of these marginal termination strips 26 and 38 afforded by the described construction thus provides an extended area for deposition of the metal coatings 50 and 52, thereby permitting secure and selective engagement of said coatings with the electrode elements. It should be noted that the metal applied by the Schoop or Fiore process can be controlled so that it will only penetrate about $\frac{1}{32}$ of an inch into the recesses 40 and 42. This limitation coupled with the deeply recessed positioning of the marginal edge 34 of the second electrode film 30 within the recess 42 effectively prevents contact of the termination coating therewith and consequent shorting of the electrode elements.

Terminal affixation to the metal coatings 50 and 52 may be effected by means well known to those skilled in this art as by serrated terminal plates or terminal strips or wires soldered in electrical and mechanical engagement therewith.

FIGURE 4 illustrates another construction of multi-strata bonded film laminae incorporating the principles of this invention. The unit there illustrated in FIGURE 4 is, in effect, a double unit of the same basic character as that set forth in FIGURES 1 and 2 and described above, wherein both surfaces of the basal substrate have conducting and dielectric films deposited thereon. For convenience, therefore, the same reference numerals will be employed with the addition of a subscript "a" for the additional films deposited on what was previously the undersurface of the basal substrate 10. As illustrated, there is provided a basal substrate 10 of a character described above and having a first conducting film 16, a first dielectric film 16 and a second conducting film 30 deposited on its upper surface. The thickness, positioning and composition of these films are the same as those of the correspondingly numerically referenced films heretofore described in conjunction with the FIGURES 1 and 2 embodiment. In addition thereto, the undersurface of the basal substrate 10 is provided with a first conducting film 16a, a first dielectric film 22a and a second conducting film 30a, each having the same thickness, positioning and composition as the corresponding and similarly referenced films deposited on the upper surface thereof.

FIGURE 4 additionally clearly shows the positioning of such films in a convolutely wound section and the provision, when so disposed, of a recess 40a disposed intermediate the marginal termination strip portions 38, 38a of the second conducting films 30, 30a at one end of the convolutely wound unit and a recess 42a disposed intermediate the exposed marginal terminal strip portions 26, 26a along the marginal edge of the first conducting films 16, 16a.

Having thus described my invention, I claim:

1. An elongate strip of multi-strata bonded film laminae comprising a basal substrate of insulation sufficiently flexible to be wound into a capacitor section and having first and second longitudinal edges, a first conducting film bonded to said substrate and extending from the first longitudinal edge of said substrate to a line spaced a predetermined distance inwardly of the second longitudinal edge of said substrate, a dielectric film bonded to the surface of said first conducting film and to said substrate adjacent said line and having a first longitudinal edge disposed a predetermined distance inwardly of the first longitudinal edge of said substrate to provide an exposed surface portion of said first conductive film, and a second conducting film bonded to the surface of said dielectric film and having a first marginal edge spaced inwardly of said first longitudinal edge of said dielectric film and said second conducting film extending to the second longitudinal edge of said basal substrate, said second conducting film being closer to said substrate adjacent said second longitudinal edge of said substrate than in areas where said second conducting film overlies said first conducting film to provide an exposed surface portion when confronted by an overlying strip 2. The multi-strata bonded film laminae as set forth in claim 1 wherein said dielectric film is formed of a deposited polyhaloethylene.

3. The multi-strata bonded film laminae as set forth in claim 1 wherein said dielectric film is formed of deposited polytetrafluoroethylene.

4. The multi-strata bonded film laminae as set forth in claim 1 wherein said dielectric film is formed of deposited polytetrafluoroethylene and said basal substrate is a film of polymethylene terephthalate resin.

5. The elongate strip of multi-strata bonded film laminae as set forth in claim 1 wherein said dielectric film is formed of a deposited polyhaloethylene and said basal dielectric substrate is a film of polymethylene terephthalate resin.

6. An elongate strip of multi-strata bonded film laminae comprising a basal substrate of insulation sufficiently flexible to be wound into a capacitor section and having first and second longitudinal edges, a first conducting layer of substantially uniform thickness bonded to said substrate, a dielectric layer of substantially uniform thickness bonded to said first conducting layer and a second conducting layer of substantially uniform thickness bonded to said first dielectric layer, said first conducting layer covering all of said substrate surface save for a marginal zone along the second longitudinal edge of the substrate, said first dielectric layer covering said marginal zone of substrate surface and all of the surface of said first conducting layer save for a zone along the first longitudinal edge of said substrate and said second conducting layer covering all of said first dielectric layer save for a zone along the edge thereof disposed inwardly of the first longitudinal edge of said substrate.

7. A capacitor including at least one convolutely wound elongated strip of multi-strata laminae comprising a basal substrate having first and second longitudinal edges, a first conducting film bonded to said substrate and extending from the first longitudinal edge of said substrate to a line spaced a predetermined distance inwardly of the second longitudinal edge of said substrate, a dielectric film bonded to the surface of said first conducting film and to said substrate adjacent said line and having a first longitudinal edge disposed a predetermined distance inwardly of the first longitudinal edge of said substrate to provide an exposed surface portion of said first conductive film, and a second conducting film bonded to the surface of said dielectric film and having a first marginal edge spaced inwardly of said first longitudinal edge of said dielectric film and said second conducting film extending to the second longitudinal edge of said basal substrate, said second conducting film being closer to said substrate adjacent said second longitudinal edge of said substrate than in areas where said second conducting film overlies said first conducting film to provide an exposed surface portion when confronted by an overlying strip, and respective terminal contacts engaging the exposed surface portions of said conductive films respectively.

8. A capacitor in accordance with claim 7 wherein said multi-strata basal substrate has first and second conducting films and a dielectric film as recited in claim 7 at each of the opposite surfaces of the substrate.

9. A capacitor in accordance with claim 7 wherein said terminal contact is a conductive coating extending between the successive convolutions.

10. A capacitor including a succession of superposed multi-strata bonded film laminae each comprising a basal substrate having first and second longitudinal edges, a first conducting film bonded to said substrate and extending from the first longitudinal edge of said substrate to a line spaced a predetermined distance inwardly of the second longitudinal edge of said substrate, a dielectric film bonded to the surface of said first conducting film and to said substrate adjacent said line and having a first longitudinal edge disposed a predetermnied distance inwardly of the first longitudinal edge of said substrate to provide an exposed surface portion of said first conductive film, and a second conducting film bonded to the surface of said dielectric film and having a first marginal edge spaced inwardly of said first longitudinal edge of said dielectric film and said second conducting film extending to the second longitudinal edge of said basal substrate, said second conducting film being closer to said substrate adjacent said second longitudinal edge of said substrate than in areas where said second conducting film overlies said first conducting film to provide an exposed surface portion when confronted by an overlying strip, and terminal contacts engaging the exposed surface portions of said conductive films respectively.

References Cited by the Examiner

UNITED STATES PATENTS

| | | | |
|---|---|---|---|
| 2,389,419 | 11/45 | Deyrup et al. | 317—261 |
| 2,476,455 | 7/49 | Roush | 317—261 |
| 2,816,273 | 12/57 | Peck | 317—242 |

FOREIGN PATENTS

| | | |
|---|---|---|
| 619,364 | 3/49 | Great Britain. |

JOHN F. BURNS, *Primary Examiner.*

SAMUEL BERNSTEIN, *Examiner.*